April 21, 1931.  J. M. BOYKOW  1,801,948
AUTOMATIC STEERING AND STABILIZING APPARATUS
Filed April 18, 1930
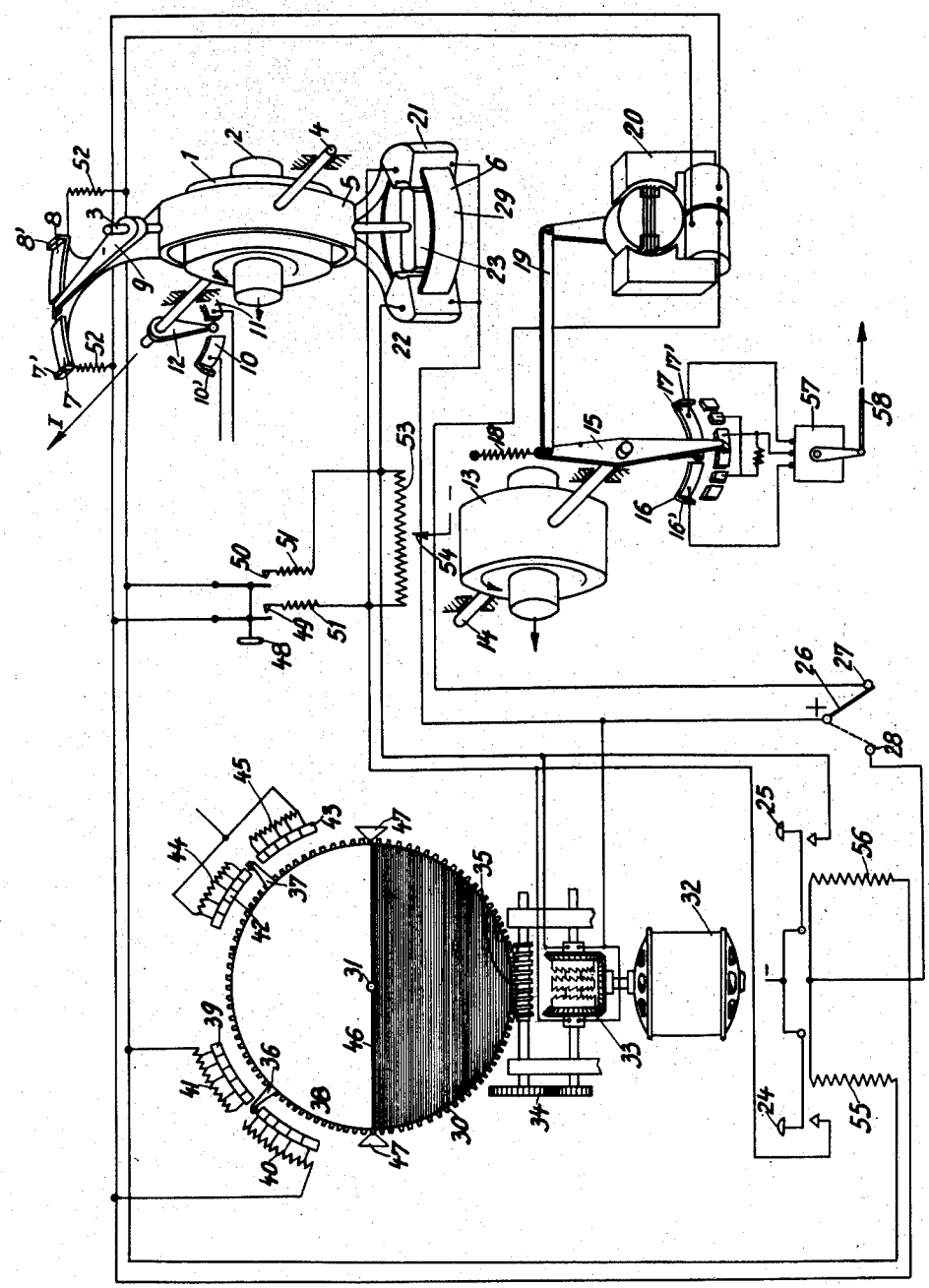
Inventor
Johann Maria Boykow
by Lotka & Kellenbeck
Attorneys Patented Apr. 21, 1931

1,801,948

UNITED STATES PATENT OFFICE

JOHANN MARIA BOYKOW, OF BERLIN-LICHTERFELDE-WEST, GERMANY, ASSIGNOR TO MESSGERATE BOYKOW, G. M. B. H., OF BERLIN-LICHTERFELDE-WEST, GERMANY, A CORPORATION

AUTOMATIC STEERING AND STABILIZING APPARATUS

Application filed April 18, 1930, Serial No. 445,312, and in Germany April 29, 1929.

This invention relates to apparatus for automatically steering and stabilizing of moved systems, for instance aircraft with respect to its course in straight flying and in flying curves, and for indicating condition of trim in such flight.

The control of the course in straight flying is effected by the rudder only. In flying in curves, the elevators, as well as the rudder, must be controlled in order to maintain the machine on the desired curve and in its position of stability. Finally, both for curved flight as also for straight flight, a lateral stabilization is necessary in order to maintain the aircraft horizontal in relation to the longitudinal axis when flying straight, and at the correct bank when flying in a curve. Moreover, it is desirable that the pilot can observe the degree of turning on an indicating device.

According to this invention the course is stabilized by a direction indicator, for instance a magnetic compass or an earth inductor or a gyroscopic indicator or a wireless bearing device, acting on the rudder through a rotary relay combined with an auxiliary gyro having a horizontal axis of rotation and a horizontal axis of precession, which is resiliently restored to a neutral position. This second gyroscope tends to damp oscillations of the vehicle about the desired direction of course which would otherwise be set up by the first gyroscope acting alone.

According to the invention the direction indicator can be a gyroscope pendulously suspended with three degrees of freedom, the axis of rotation of which is horizontal, which responds by precession about a vertical axis of lateral acceleration of the vehicle consequent on turning. This direction indicator may be used alone.

In order to enable turning to be effected, in spite of the course stabilization by the two gyroscopes, an electromagnetic system is combined with the first gyroscope which causes, by means of suitable switches, a turning moment, appropriate in magnitude and sense of rotation, to be exerted on the vertical axis of precession of the said gyroscope, thereby causing the vehicle to turn, the two gyroscopes then stabilizing the aircraft in the curve course.

Further, according to the invention, a contact device for automatically stabilizing the aircraft laterally is combined with the horizontal axis of precession of the course gyro which actuates the ailerons when the equilibrium of the vehicle and of the course gyro are different from each other.

Since the effect on the first gyroscope of the magnet system upon going over to the curved course is relatively small, a second actuating device is provided which causes the aircraft to take up the curved course quickly upon switching-in the magnet system. This second control device acts as well on the rudder as on the elevators and adjusts them to the necessary extent for the curved course. The apparatus consists of a contact device which, by means of graduated resistances, acts on the rotary relay for actuating the rudder and on a servomotor controlling the elevator. The adjustment of the contacts of this auxiliary control device is effected in accordance with the turning moment exerted on flying curves by the aforesaid magnet system on the vertical axis of precession of the first gyroscope. According to the invention a trim indicator may be connected to the rotary contacts of this auxiliary control device which indicator is adjusted on the trim in a curve corresponding to the centrifugal acceleration when the magnet system of the course gyro is adjusted to flying on a curved course. This can, for example, be effected by a continuously running motor which adjusts the rotary contacts of the auxiliary control device and the indicator by means of a reversing gearing and which is switched in and out by the contacts for setting the aircraft on a curved course.

Further, the invention includes a control switch which causes the aircraft to be brought back definitely on to a straight course out of a rest curve or residual turning at the end of a turning movement. This contral switch causes the aforesaid magnet system to exert a correcting moment on the first gyroscope for restoring the aircraft into the straight course.

Further, a regulating resistance is provided which causes small regulatable correcting moments to be exerted on the vertical axis of precession of the course gyro.

Finally, a feature of the invention is a switch by means of which, when the aircraft is controlled by hand, relay-magnets may be switched in preparatory which, during hand-controlled flight, are actuated by the course stabilizing contact device of the first gyroscope and control the curved-course switch with the object of automatically setting the position indicator and the magnet system on the first gyroscope. This switch is so combined with the main switches of the control devices that it switches in the relay magnets of the curved-course switch when the control devices are switched out.

In the drawing an apparatus according to the invention is illustrated diagrammatically. The apparatus includes a gyroscope 1 which will be referred to as the course gyroscope. This is a gyroscope with a horizontal axis of rotation 2 lying at right angles to the direction of flight (arrow I), the impulse vector (north-seeking end) of which lies to the left and which has a Cardan suspension so that it has a vertical axis of precession 3 and a horizontal axis of precession 4, that is to say, three degrees of freedom in all. The freedom about the horizontal axis 4 is restricted by the fact that the gyroscope with its components has a low-lying centre of gravity, in the example of construction illustrated owing to the fact that a magnet system 6 is mounted on the Cardan ring 5 below the centre of gravity of the system.

This course gyroscope controls the rudder by means of two contacts 7 and 8 and a contact arm 9 on the vertical axis of precession 3 and controls the ailerons by means of a similar contact device 10, 11, 12, the contact arm 12 of which is fixed to the horizontal axis of precession 4. Stops 7′, 8′, and 10′ at the end of contacts 7, 8 and 10 limit the movement of the gyro 1 about the precession axis 3 and 4. The contact 11 has a similar stop not shown on the drawing.

For controlling the rudder, an auxiliary gyroscope 13 is arranged by the side of the course gyroscope 1 in order to damp the control movement and the axis of rotation of the gyroscope 13 is horizontal. This gyroscope, however, only has one degree of freedom about a horizontal axis 14, that is to say, two degrees of freedom in all. A contact arm 15 is fixed on the axis 14, and by means of contacts 16 and 17 with end stops 16′ and 17′ controls the rudder. A spring 18 tends to maintain the auxiliary gyroscope 13 in the position illustrated. The gyroscope 13 and the contact arm 15 are connected with a rotary relay 20 by the coupling rod 19, and the relay 20 is controlled by the contact device 7, 8, 9 of the course gyroscope 1. The course gyroscope thus does not act directly on the side rudder but through the rotary relay 20 and the contact device 15, 16, 17. The contact arm 9 is connected to the negative pole of an electric current supply while the point 26 is connected to the positive pole.

The parts of the apparatus so far described are sufficient to keep the aircraft on a straight course. The method of operation in doing this is as follows:—

Assuming that the machine deviates from the course to one side, a lateral acceleration acts upon the apparatus, causing a precession of the gyroscope 1 about the vertical axis 3 and therewith switching-in of the rotary relay 20 through the contact device 7, 8, 9, in which the sense of rotation of the relay 20 depends upon whether the arm 9 runs on to the contact 7 or the contact 8. The rotary relay again alters the angular position of the gyroscope 13 and the contact arm 15, and by means of the contacts 16 or 17 switches-in a reversible motor 57 which is coupled with the rudder through the connecting rod 58. The motor thus turns the rudder in the one or other direction in order to correct the deviation from the straight course.

If the rudder were only controlled from the course gyroscope 1, the aircraft would oscillate continuously about the straight course. This is avoided by the auxiliary gyro 13 because the spring 18 tends to return this into the neutral position of the contact device 15, 16, 17. At the beginning, the course gyroscope 1 and the relay gyroscope 13, assist one another and both act upon the rudder in concert. As a result, the angular speed of deviation from the straight course is smaller.

If, however, this angular speed has fallen to a predetermined value, the spring 18 becomes stronger than the precessional moment of the gyroscope 13 and will turn the gyroscope 13 with the contact arm 15 back, in spite of the contact arm 9 still standing on the contact 7 or 8 against which it has abutted at the beginning of the deviation from the straight course. The gyroscope 13 does not simply return into the neutral position of the contact device 15, 16, 17 but swings somewhat past the neutral position so that the contact arm 15 at once runs over on to the other of the contacts 16 or 17 shortly before the aircraft is laid back into its correct course. Consequently, shortly before this instant, the rudder swings back into an opposite position and checks the return swing. This again has the result that not only is the contact arm 15 again returned into the disconnected position by the spring 18, but also the contact arm 9 is brought back into its neutral position. In this way, the relay gyroscope 13 damps the return swing of the aircraft which would otherwise carry it to the other side of the straight course.

In order to be able to cause the aircraft to assume a curved course, the magnet system 6 is mounted on the Cardan suspension of the course gyroscope 1. This consists of two field magnet windings 21, 22 with an iron core 29 and an armature 23 which may be a permanent magnet. Further, two contact keys, 24, 25 are arranged of which, for example, the key 24 is allotted to a left-hand turn and the key 25 to a right-hand turn. Finally, there is a switch arm 26 which connects with the contact 27 of the apparatus for complete automatic control and with the contact 28 for hand control. First of all, only the automatic control will be considered.

Depression of the key 24 energizes the winding 21 while depression of the key 25 energizes the winding 22. These windings set up in the iron core 29 opposing fluxes so that according to the pressing of the key 24 or 25, the armature 23 is turned in one direction or the other. Since the armature 23 is fixed rigidly to the vertical axis of precession 3 of the gyroscope 1, a corresponding turning moment is exerted on it. This turning moment causes a precession of the gyroscope about the axis 4 which, however, the gyroscope, together with its suspension, resists because the centre of gravity of the whole is low.

Since the gyroscope can only execute precession about the axis 4 under restraint by gravity, it also precesses about the axis 3 so that the contact arm 9 again abuts against the contacts 7 or 8 which again has the result of switching in the rotary relay 20 so that the aircraft flies in a curve. As a result, a centrifugal acceleration is set up and this causes a corresponding precession of the gyroscope with its suspension system about the axis 4.

The precession about the axis 4 has the effect that the contact arm 12 abuts against the contacts 10 or 11 and now also actuates the ailerons with the result that the aircraft is banked to an extent corresponding to the turn. The ailerons, as soon as the correct position is attained, are automatically switched-out since the contacts 10 and 11 are connected to the aircraft body.

The effect on the rudder through the contact device 7, 8, 9 is, however, too small to turn the aircraft with the necessary speed. Consequently, a second control device is provided which sets the rudder, as well as the elevator, to the necessary degree for the speed of turning. This apparatus consists of a disc 30 which is rotatable about an axis 31. A continuously rotating electric motor 32 with a reversing gearing 33 serves for driving this disc, the gearing 33 being connected to the disc through a pair of wheels 34 and a worm 35. The reversing gear is likewise connected with the keys 24 and 25 by means of the conductors shown. Also, like the disc 30, contact arms 36, 37 are fixed on the spindle 31 and co-operate the sub-divided contact segments 38, 39 and regulating resistances 40, 41 on the one hand, and similar contact segments 42, 43 and similar resistances 44, 45 on the other hand. The contact arm 36 again controls the rudder through the rotary relay 20. The contact arm 37 causes the elevator to be adjusted in accordance with the curve desired. Finally, on the disc 30 a horizontal mark 46 is mounted which, by the aid of pointers 47, enables the degree of banking or the speed of the turn or its radius, to be read against a circular scale on the disc 30 according to the division of the scale or on several scales. If the degree of banking is also to be read, the speed of rotation imparted to the disc 30 through the motor 32 and the transmission gearing must be the same as the speed with which the bank is altered by the ailerons, This may be effected by suitable regulation of the motor speed and choice of the gear ratio.

The disc 30 and the contact arms 36, 37 rotate so long as one of the keys 24, 25 is depressed. If the keys are released, a new position of stability of the aircraft is produced and the gyroscopes 1 and 13 stabilize the aircraft on the curved course so adjusted. By pressing the opposite key at any time, the machine may be automatically brought back to a straight course.

Since the possibility arises that the indication provided by the disc 30, owing to errors in the apparatus, does not correspond exactly to the true condition of the aircraft, and therefore that in spite of the return of the disc 30 into the zero position there is still a residual turning present, a control apparatus is provided which removes the residual curvature of the course. For this purpose a control key 48 with two contacts 49, 50 is provided. If the contact arm 9 stands between the contacts 7 and 8, there is no closure of a circuit upon depressing the key 48. If, however, there is a residual turn present, the contact arm 9 stands according to the sense of the curve either on the contact 7 or the contact 8. Then, upon depressing the key 48, if, for example, the arm rests on the contact 7, a flow of current takes place through the field magnet coil 21 of the course gyroscope. The current switched in in this way is kept so weak by means of the resistances 51 that the reversing gear 33 is not actuated. On the other hand, the turning moment from the coil 21 or 22 is sufficient to move back the pendulous system of the course gyroscope 1 into the vertical position and with it the aircraft into straight flight.

Resistance 52 similar to the resistances 51 serve for adjusting the turning movement on the relay 20 controlled by the course gyroscope, Finally, a regulating resistance 53 with an adjustable contact 54 serves to compensate for differences in the effect of the coils 21 and 22 or other disturbances for example the effect of the rotation of the earth on the gyro 1, in that according to the position of the contact 54, it causes different small currents to flow through the coils 21 and 22 and thus exerts corresponding small correcting moments on the course gyroscope.

If the switch 26 is in the position shown, the individual devices described operate in the manner described. If the machine is to be controlled by hand, the switch arm 26 is placed in the dotted position on the contact 28; then the connection is such that the disc 30 still works as a turn indicator or bank indicator, but on the other hand the controlling devices, the main switch of which is connected with the switch arm 26, are disconnected. The disc 30 is then shifted in such that when turning occurs the contact arm 9 comes into contact on one of the contacts 7 or 8, and the reversing gearing 33 is connected by means of the magnets 55 and 56 which act on the keys 24 and 25.

What I claim is:—

1. A course-keeping device for a dirigible vehicle having a rudder, comprising in combination a direction indicator, a gyroscope neutrally suspended and responsive to turning in a horizontal plane by precession about a horizontal axis, means restraining precessional movement of said gyroscope, a non-rigid yielding connection between the gyroscope and the direction indicator, and an operative connection between the gyroscope thus coupled and the rudder of the dirigible vehicle adapted to cause the rudder to move, in response to precession of the gyroscope as aforesaid, to bring the vehicle back on to the said course.

2. A course-keeping device for a dirigible vehicle having a rudder, comprising in combination a direction indicator, a gyroscope neutrally suspended and responsive to turning in a horizontal plane by precession about a horizontal axis, means restraining precessional movement of said gyroscope, a non-rigid yielding connection between the gyroscope and the direction indicator, an operative connection between the gyroscope and the rudder adapted to cause the rudder to move, in response to precession of the gyroscope due to course deviations, to bring the vehicle back on to the said course, and means for applying a turning moment at will in either direction to the gyroscope.

3. A course-keeping device for a dirigible vehicle having a rudder, comprising in combination a pendulous gyroscope responsive to lateral acceleration by precession about a vertical axis, a second gyroscope neutrally suspended and responsive to turning in a horizontal plane by precession about a horizontal axis, means restraining precessional movement of said second gyroscope, a non-rigid yielding connection between the two gyroscopes, an operative connection between the two gyroscopes thus coupled and the rudder of the dirigible vehicle adapted to cause the rudder to move, in response to precession of the gyroscopes as aforesaid, to bring the vehicle back on to the said course, and means for applying a turning moment at will in either direction to the first-mentioned gyroscope about its vertical axis.

4. A course-keeping device for aircraft requiring to be banked when turning, comprising in combination a pendulous gyroscope having a vertical precessional axis and a horizontal precessional axis transverse to the aircraft, an operative connection between the gyroscope and the rudder of the aircraft adapted to cause the rudder to move, in response to precession of the gyroscope about its vertical axis due to lateral acceleration, in a direction to cause turning of the aircraft in the sense opposite to the sense of the said precession, means for applying a turning moment at will to the gyroscope in either direction about the vertical axis, and an operative connection between the gyroscope and the lateral control means of the aircraft to cause said means to move, in response to swinging of the pendulous gyroscope towards the outside of the curved course brought about by the aforesaid turning moment, to bank the aircraft in accordance with the said curved course.

5. In combination with the invention of claim 2, means for applying additional effort to the rudder in the same sense as that imparted thereto by the operative connection between the gyroscope and the rudder, said means being under the same manual control as the means aforesaid for applying a turning moment to the gyroscope.

6. In combination with the invention of claim 4, means for applying additional effort to the rudder in the same sense as that imparted thereto by the operative connection between the gyroscope and the rudder and for concurrently and appropriately operating the elevators of the aircraft, said means being under the same manual control as the means aforesaid for applying a turning moment to the gyroscope about the vertical axis.

7. A course-keeping device for a dirigible vehicle having a rudder, comprising in combination a gyroscope suspended pendulously with three degrees of freedom and having its axis of rotation normally horizontal and transverse to the direction of motion of the vehicle, a rudder-actuating servomotor operated electrically, electric contact means for causing the servomotor to be operated, an electromagnetic device for actuating the electric contact means, means actuated by the gyroscope on precession about the vertical axis for energizing said electromagnetic device and a second gyroscope neutrally suspended about a horizontal precessional axis and having its axis of rotation normally horizontal, means tending to maintain said second gyroscope in a neutral position about the horizontal precessional axis, and an operative connection between said second gyroscope and the contact means aforesaid for actuating said contact means together with the gyroscope first mentioned under the same conditions of turning of the vehicle.

8. The invention of claim 7 in combination with manually-controlled means for energizing the electromagnetic device.

9. The invention of claim 2 in combination with manually-controlled means for applying a turning moment to the gyroscope in either direction at will about a vertical axis.

10. A course-keeping device for aircraft requiring to be banked when turning, comprising in combination a gyroscope suspended pendulously with three degrees of freedom and having its axis of rotation normally horizontal and transverse to the direction of motion of the aircraft, a rudder-actuating servomotor operated electrically, electric contact means actuated by the gyroscope on precession about the vertical axis for operating said servomotor, a second electrically-operated servomotor for actuating the lateral-control means of the aircraft, and electric contact means actuated by the gyroscope on precession about a horizontal axis lying in the direction of motion of the aircraft for operating said second servomotor.

11. In combination with the invention of claim 10, manual means for applying a turning moment to the gyroscope in either direction about the vertical axis.

12. In combination with the invention of claim 4, means for applying additional efforts to the rudder in the same sense as that imparted thereto by the operative connection between the gyroscope and the rudder, said means being under the same manual control as the means aforesaid for applying a turning moment to the gyroscope and an indicating device adapted to indicate the amount of deviation of the aircraft from the normal attitude.

13. In combination with the invention of claim 4, means for applying additional efforts to the rudder in the same sense as that imparted thereto by the operative connection between the gyroscope and the rudder, said means being under the same manual control as the means aforesaid for applying a turning moment to the gyroscope and an indicating device under said manual control adapted to indicate the amount of deviation of the aircraft from the normal attitude.

14. In combination with the invention of claim 10, a continuously rotating motor, an indicator wheel carrying contact means adapted on rotation of the wheel to energize the rudder-actuating servomotor in one sense or the other depending on the sense of the rotation of the wheel and to an extent depending on the degree of rotation of the wheel, electrically-operated clutch means for clutching the motor to the wheel for rotation in either direction, manually-operated switches for selectively actuating said clutch means, and means for applying a turning moment to the gyroscope in either direction, said last-mentioned means being under the control of said switches.

15. In combination with the invention of claim 10, a continuously rotating motor, an indicator wheel carrying contact means adapted on rotation of the wheel to energize the rudder-actuating servomotor in one sense or the other depending on the sense of the rotation of the wheel and to an extent depending on the degree of rotation of the wheel, electrically-operated clutch means for clutching the motor to the wheel for rotation in either direction, manually-operated switches for selectively actuating said clutch means, electromagnetic means for applying a turning moment to the gyroscope in either direction, said electromagnetic means comprising two opposed elements selectively under the control of said switches, and an additional switch adapted when operated to energize one or other of said elements in accordance with the position, on one side or the other of the neutral position, of the aforesaid electric contact means actuated by the gyroscope on precession about the vertical axis.

16. In combination with the invention of claim 15, a resistance having two variable branches, one in circuit with one of said elements, and the other in circuit with the other, adapted to vary the relative degree of energization of the two elements.

17. In combination with the invention of claim 16, electromagnetic means for operating said switches, and a switch for disconnecting the aforesaid electric contact means actuated by the gyroscope on precession about the vertical axis from the rudder-actuating servomotor and for connecting said contact means to the aforesaid electromagnetic means for selective energization thereof in accordance with the sense of the precession of the gyroscope about the vertical axis.

18. A course-keeping device for a dirigible vehicle having a rudder, comprising in combination a pendulous gyroscope responsive to lateral acceleration by precession about a vertical axis, and an operative connection between the gyroscope and the rudder of the dirigible vehicle adapted to cause the rudder to move, in response to precession of the gyroscope due to lateral acceleration consequent on deviation from a course, to bring the vehicle back on to the said course.

19. A course-keeping device for a dirigible vehicle having a rudder, comprising in combination a gyroscope suspended pendulously with three degrees of freedom and having its axis of rotation normally horizontal and transverse to the direction of motion of the vehicle, a rudder-actuating servomotor operated electrically, and electric contact means actuated by the gyroscope on precession about the vertical axis for operating said servomotor.

In testimony whereof I affix my signature.

JOHANN MARIA BÖYKOW.